United States Patent
Kosugi et al.

[11] Patent Number: 5,995,751
[45] Date of Patent: *Nov. 30, 1999

[54] INFORMATION PROCESSING APPARATUS

[75] Inventors: Masato Kosugi, Yokohama; Atsushi Date, Tokyo; Kazumasa Hamaguchi, Yokohama; Toshiyuki Fukui, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/795,454

[22] Filed: Feb. 4, 1997

Related U.S. Application Data

[63] Continuation of application No. 08/248,378, May 24, 1994, abandoned.

[30] Foreign Application Priority Data

May 31, 1993 [JP] Japan ..................................... 5-129436

[51] Int. Cl.⁶ ..................................................... G06F 1/12
[52] U.S. Cl. ........................................... 395/701; 395/551
[58] Field of Search .................................... 395/559, 806, 395/807, 701, 551; 345/302, 506; 382/303; 711/140, 169

[56] References Cited

U.S. PATENT DOCUMENTS

| | | | |
|---|---|---|---|
| 4,641,253 | 2/1987 | Mastran | 364/518 |
| 4,737,907 | 4/1988 | Federico et al. | 364/200 |
| 4,850,027 | 7/1989 | Kimmel | 382/49 |
| 4,916,659 | 4/1990 | Persoon et al. | 711/169 |
| 4,979,096 | 12/1990 | Ueda et al. | 364/200 |
| 4,985,848 | 1/1991 | Pfeiffer et al. | 364/518 |
| 5,007,100 | 4/1991 | D'Aoust et al. | 382/49 |
| 5,083,265 | 1/1992 | Valiant | 711/169 |
| 5,287,416 | 2/1994 | Capo et al. | 382/41 |
| 5,289,577 | 2/1994 | Gonzales et al. | 395/163 |
| 5,471,576 | 11/1995 | Yee | 395/154 |
| 5,561,804 | 10/1996 | Kanekura | 395/800.01 |
| 5,574,939 | 11/1996 | Keckler et al. | 395/800.01 |
| 5,586,282 | 12/1996 | Iino et al. | 711/169 |
| 5,619,730 | 4/1997 | Ando | 711/169 |

*Primary Examiner*—Tariq R. Hafiz
*Assistant Examiner*—John Q. Chavis
*Attorney, Agent, or Firm*—Morgan & Finnegan, LLP

[57] ABSTRACT

An information processing apparatus in which continuous data of a plurality of series in which the contents of the data of each series are related to each other with respect to time is pipeline processed by a data processing system. The apparatus comprises a plurality of sync generation circuits which correspond to the plurality of series and each of which generate sync signals to instruct timings for the data transfer and data process of each series, and a sync control circuit for controlling generation situations of the sync signals from the plurality of sync generation circuits in accordance with a degree of progress of the data process of each series in the data processing system so that the data of each series can be processed in the data processing system without losing the time-dependent relation.

10 Claims, 8 Drawing Sheets

INFORMATION PROCESSING APPARATUS

This is a continuation of application Ser. No. 08/248,378, filed on May 24, 1994 now abandoned.

BACKGROUND OF THE INVENTION

1. Field of the Invention

The invention relates to an apparatus for pipeline processing continuous data of a plurality of series.

2. Related Background Art

Included in conventional computer systems, are a general system using one processor, a multiprocessor system which commonly uses a memory, an operation pipeline system, and an image processing multiprocessor system of the area division type, among others.

In recent years, there has been an increasing need for real time processing of the critical information, such as continuous digital data of a moving image, or the like, by general computer systems. Processes which are executed to those digital data are data processes in a real time such that they will be meaningless unless the processes are finished within a predetermined time.

In the conventional system as mentioned above, however, in a computer system using a single CPU, a calculating function is lacking and it is impossible to execute such data processes within real time.

A system like a multiprocessor system which can execute processes at a high speed by using a plurality of processors has been proposed. In the conventional system represented by a multiprocessor system of the shared memory type, however, competition in the memory system occurs in the input/output and display operations of data and in the processes of the processor, so that such a competition obstructs the realization of the high-speed processes.

In a system like an operation pipeline machine which executes pipeline processes on a unit basis of data of fine dots, in the case where an amount of data to be processed together is large as in a moving image, the processes cannot be performed at a high speed because of its construction. A system where image data is divided into a plurality of regions and a plurality of processors are allocated to those regions and image processes are executed at a high speed has also been proposed. Most of such systems, however, have a construction such that the memory system is divided into a number of small regions, and intend to realize a high speed of the processes after the data to be processed was once loaded into the memory. It takes time to write and read out the image data. Moving image data or the like cannot be continuously processed.

In general, the moving image data is accompanied with audio data. Since the audio data is also realtime data, it must be output simultaneously with the corresponding moving image data. For example, in the computer using a single CPU, when significance is paid to the synchronization and simultaneousness of the moving image data and the audio data, processes such that the audio data is processed by paying an importance thereto and the moving image data is thinned out into the picture planes of the number of [1/(a few number)] and into the pixels of the number of [1/(a few number)] of those of the original moving image data and the image is displayed are merely executed as a better method. Further, even in the audio data process, a situation such that the process is influenced by other processes of a heavy load and the output is interrupted can occur.

SUMMARY OF THE INVENTION

It is therefore an object of the invention to provide an information processing apparatus in which continuous data of a plurality of series in which the contents of the data of each of the series are related to each other with respect to time can be processed without losing such a time-dependent relation.

To accomplish the above object, according to an embodiment of the invention, there is provided an information processing apparatus in which continuous data of a plurality of series in which the contents of the data of each of the series are related to each other with respect to time is pipeline processed by a data processing system, wherein the apparatus comprises: a plurality of synchronization generating units which correspond to the plurality of series and each of which generates a synchronization signal to indicate timings for data transfer and data process of each series; and a synchronization control unit for controlling generation situations of the synchronization signals in the plurality of synchronization generating means according to the stage of progress of the data process of each series in the data processing system in a manner such that the data of each series can be processed in the data processing system without losing its time-dependent relation.

According to the embodiment with the above construction, the continuous data of each series is transferred and processed in the data processing system at the timings of the corresponding synchronization signals, and the processing proceeds without losing the time-dependent relation of the contents of the data of each series.

The above and other objects and features of the present invention will become apparent from the following detailed description and the appended claims with reference to the accompanying drawings.

DETAILED DESCRIPTION OF THE PREFERRED EMBODIMENT

The invention will now be described in detail hereinbelow with respect to an embodiment.

Figure 1:
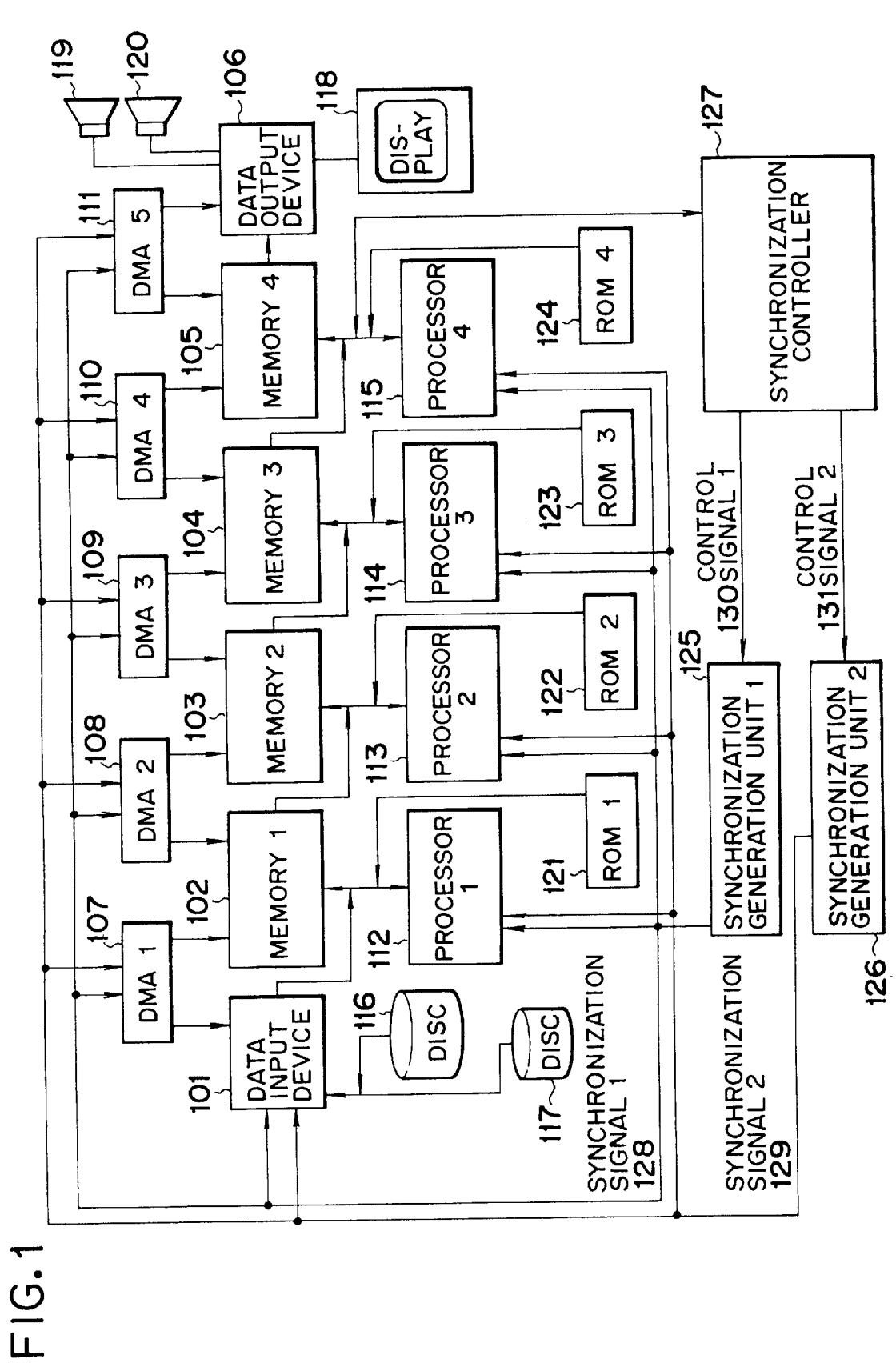
FIG. 1 is a block diagram of an embodiment 1.

FIG. 1 is a block diagram of an "information processing apparatus" as an embodiment. In FIG. 1, reference numeral 101 denotes a data input apparatus. In the embodiment, disc devices 116 and 117 are used as data input media. However, a network or the like can be also used as a data input medium. Reference numerals 102, 103, 104, and 105 denote memories (1 to 4) which are simultaneously independently accessed by four processors (1 to 4) 112, 113, 114, and 115. Reference numeral 106 denotes a data output device which is connected to a display 118 and speakers 119 and 120 in the embodiment. A hard disc or the like can be used as a data output apparatus.

Reference numerals 125 and 126 denote synchronization (also simply abbreviated to "sync") generation units which are set so as to generate a synchronization (sync) signal every 1/30 second. Such a time interval can be freely set and is not limited to this example of the embodiment. Sync signals 1 and 2 of the sync generation units 125 and 126 are input to the processors 1 to 4, data input device 101, and direct memory access controllers 1 to 5 (DMA 1 to DMA 5) 107 to 111. The sync generation units 1 and 2 are controlled by a synchronization (sync) controller 127. The sync controller 127 is connected to the memory 4 (105) and the processor 4 (115) and monitors the process (time code or the like of real-time data) of the processor 4 (115).

Figure 2:
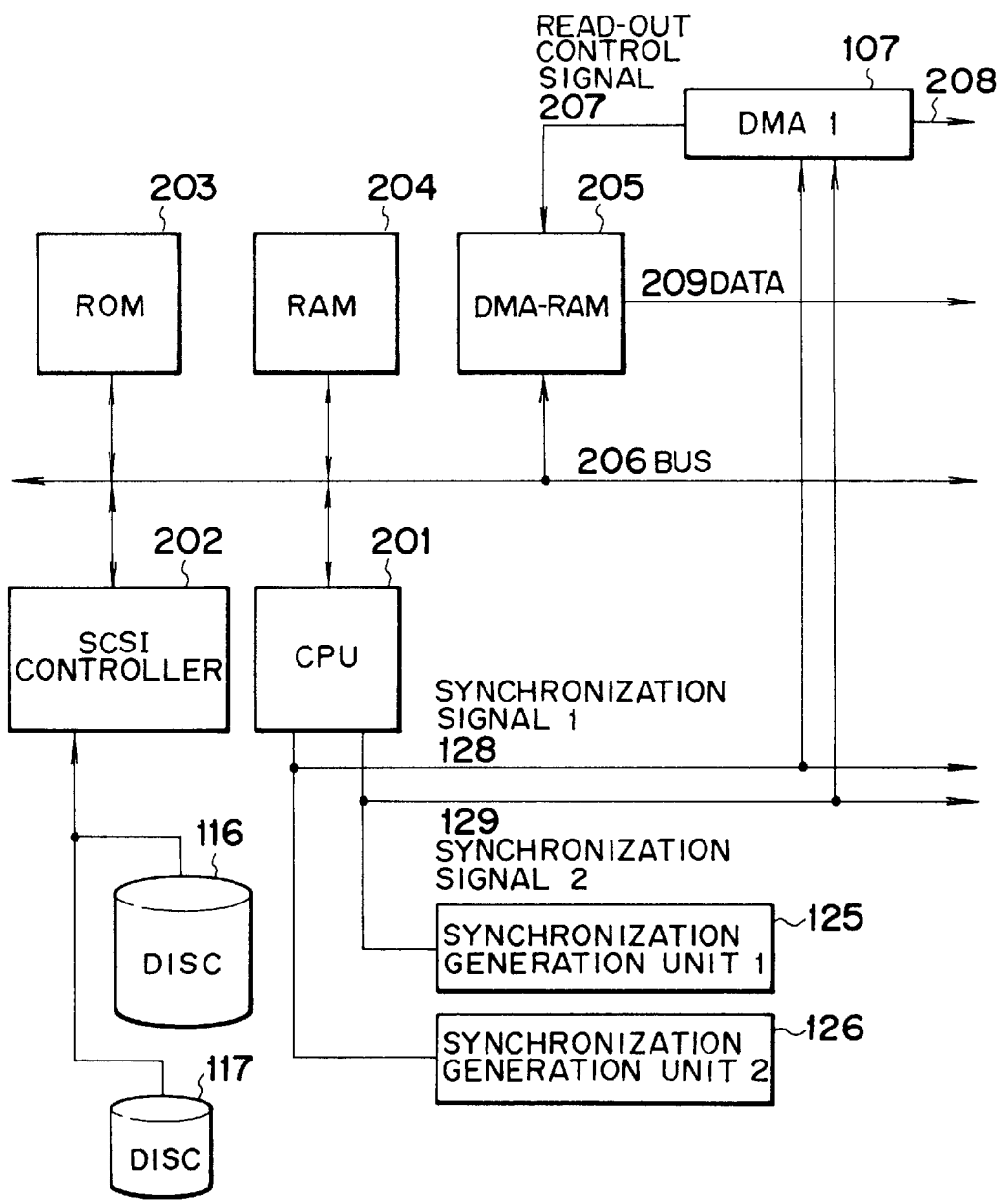
FIG. 2 is a block diagram showing a construction of a data input apparatus.

FIG. 2 is a block diagram showing a construction of the data input device. In the diagram, reference numeral 201 denotes a processor to control the data input device. The processor 201 uses this RAM 204 as a work area by a program stored in ROM 203 and controls an SCSI (Small Computer System Interface) controller 202. Data which was read out by the disc devices 116 and 117 is transferred to a DMA-RAM 205 through a bus 206. The DMA-RAM 205 has a dual-port construction and can be accessed at random from the CPU 201 and can write data to an arbitrary position. The DMA 1 is a general direct memory access controller and outputs a read-out control signal 207 to the DMA-RAM 205 by the sync signals 1 and 2. The DMA 1 also outputs to the memory 1 (102) a writing and read-out control signal 208 for writing data 209 which was output from the DMA-RAM 205.

Figure 3:
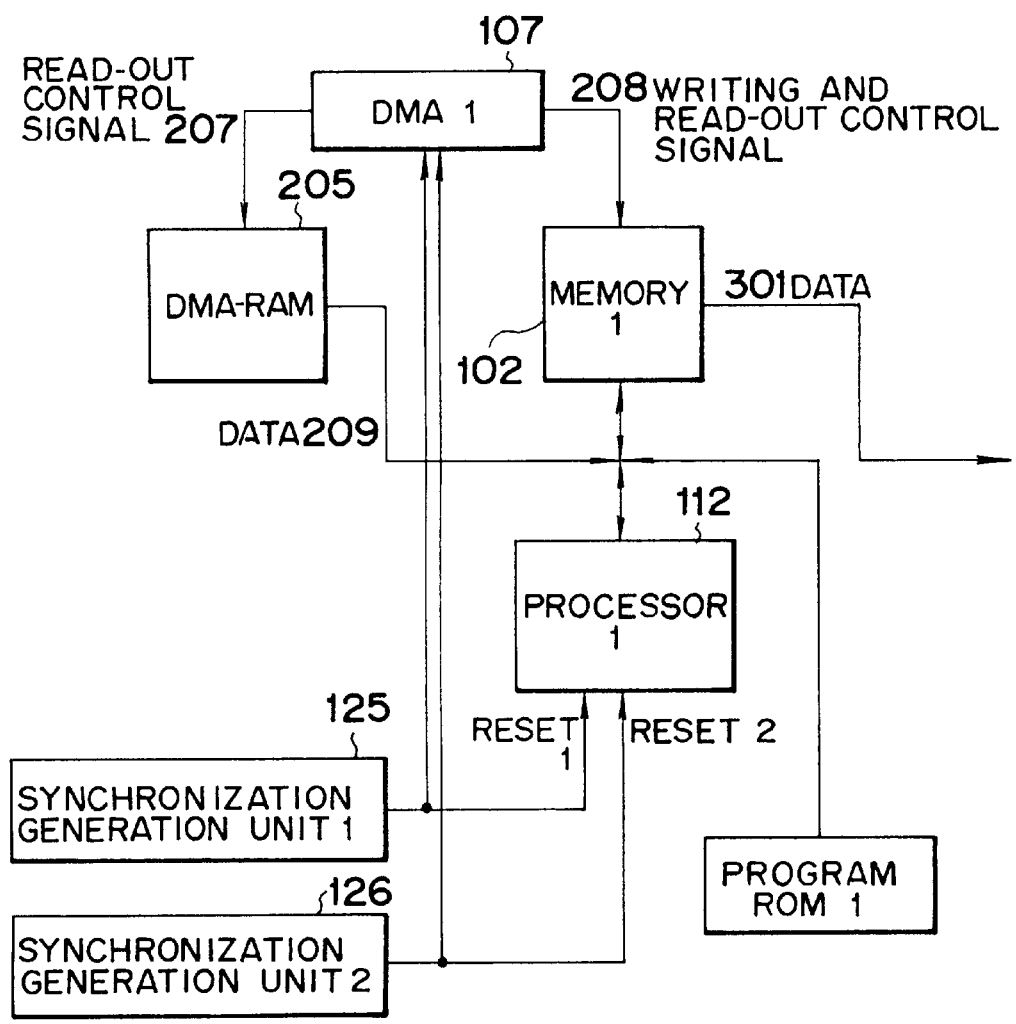
FIG. 3 is a block diagram of each processor and a memory section.

FIG. 3 is a block diagram showing each processor and a memory section and shows the portions of the processor 1 and memory 1 as an example. In the diagram, the memory 1 has a dual-port construction comprising a random port which is used for access by the processor 1 and DMA-RAM 205 and a read port to output data to the memory 2. The processor 1 is controlled by the program stored in the program ROM 1 and the sync signal supplied to a reset terminal and executes processes to the data in the memory 1. The constructions of the processor, memory, program ROM, and DMA are also similar with respect to the processors 2 to 4 (113 to 115).

Figure 4:
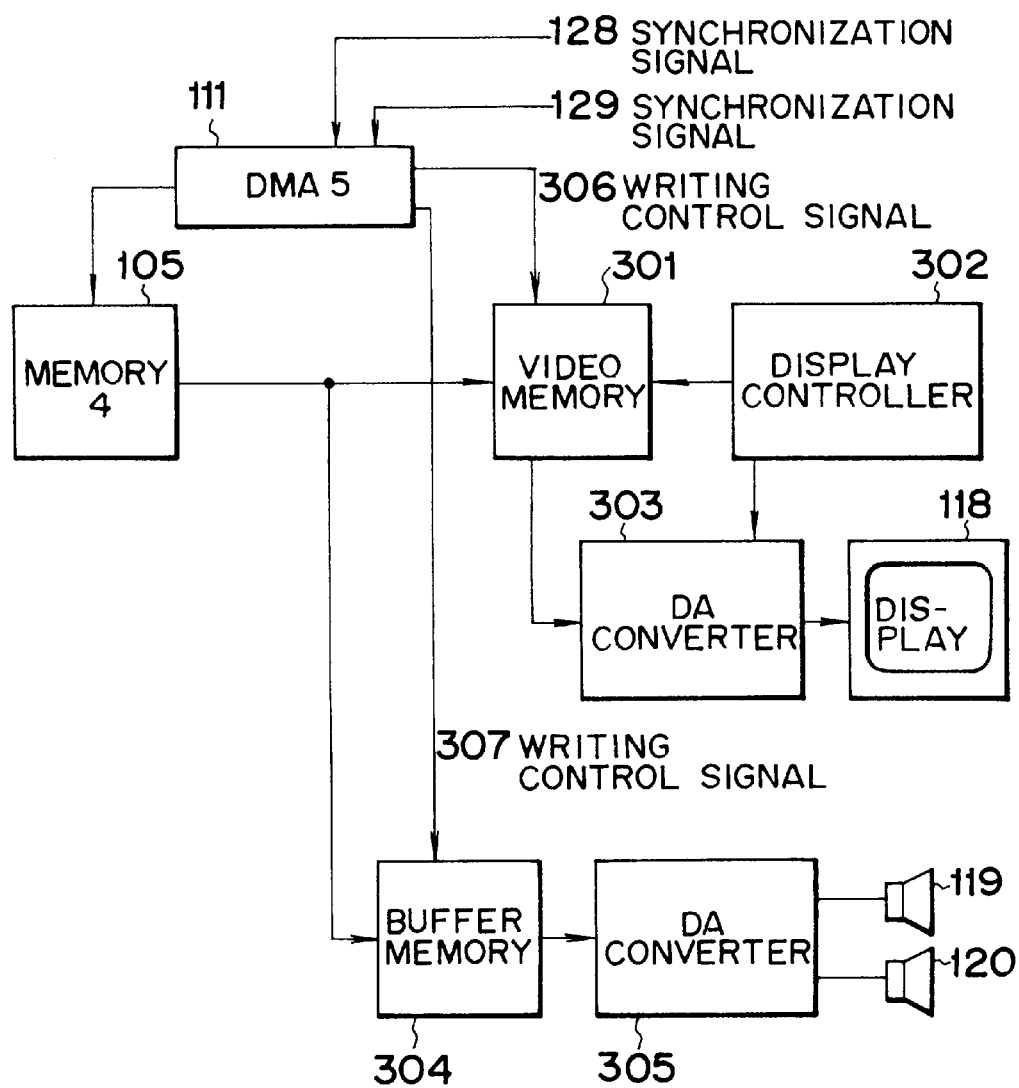
FIG. 4 is a block diagram showing a construction of a data output apparatus.

FIG. 4 is a block diagram showing a construction of the data output device. A video memory 301 is constructed by using a general video RAM. A memory 304 is a buffer memory using an FIFO (First-In-First-Out) memory or the like. Data which was output from the memory 304 is input to a random access port of the video memory 301 synchronously with the sync signal 1 by the DMA 5. At the same time, a writing control signal 1 (306) is produced by the DMA 5 and is input as an address and a control signal of the video memory 301. Reference numeral 302 denotes a display controller to produce a control signal for outputting the data from a serial port of the video memory 301 and a sync signal of the display 118. Such an apparatus is well known as a control apparatus of a graphics system. Reference numeral 303 denotes a DA converter for converting the output data of the video memory 301 into the analog signal to the display 118. The DA converter 303 is also well known. Reference numeral 118 denotes the display.

A writing control signal 2 (307) is produced by the DMA 5 (111) and the data which was output from the memory 4 (105) is input as a control signal of the buffer memory 304 synchronously with the sync signal 2. Reference numeral 305 denotes a DA converter. In the embodiment, the DA converter 305 converts the digital data of 16 bits of two right and left channels into analog audio signals. The audio output signals are supplied to the speakers 119 and 120, respectively.

Figure 5:
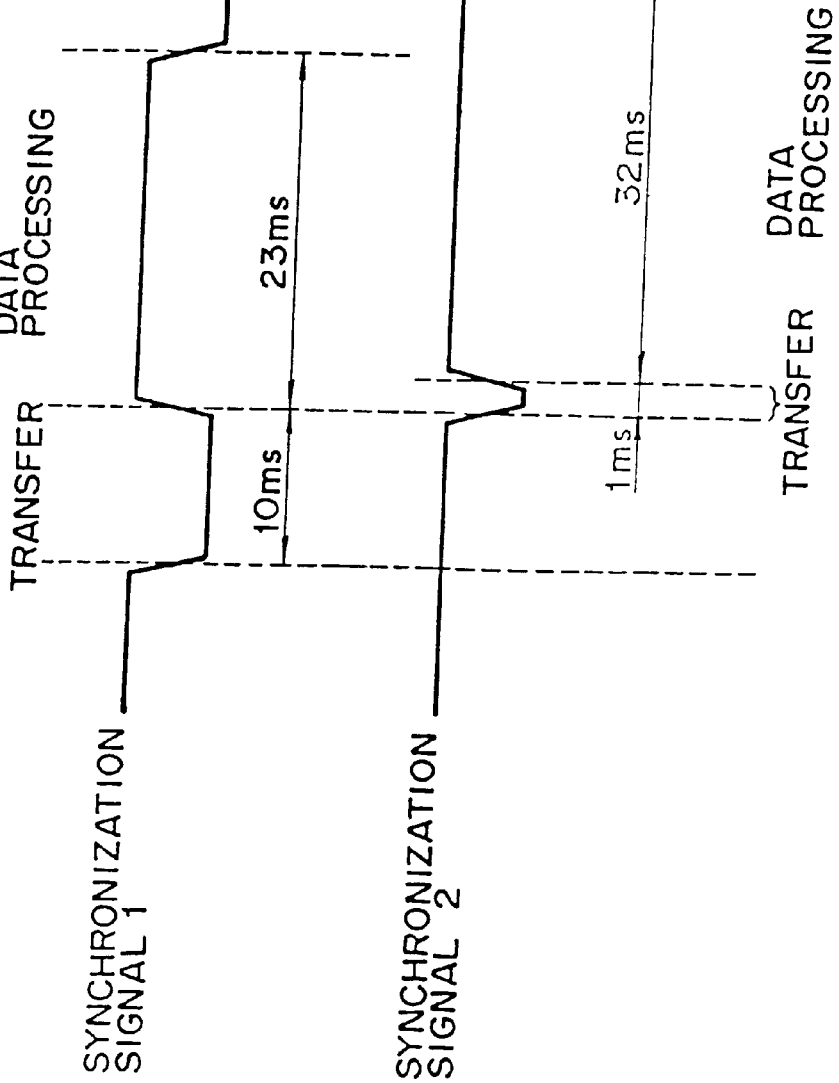
FIGS. 5A and 5B are timing charts of synchronization signals.

FIG. 5 is a diagram showing standard timings of the sync signals 1 and 2, FIGS. 5A and 5B respectively. A synchronizing period of the sync signal 1 is set to 33 msec. The initial 10 msec of the synchronizing period is a transfer period during which the sync signal 1 is held at the low level. The remaining 23 msec of the synchronizing period is a data processing period during which the sync signal 1 is held at the high level. A synchronizing period of the sync signal 2 is set to 33 msec. The initial 1 msec of the synchronizing period is a transfer period during which the sync signal 2 is held at the low level. The remaining 32 msec of the synchronizing period is a data processing period during which the sync signal 2 is held at the high level. The sync signal 1 is used to process the image data. The sync signal 2 is used to process the audio data. Generally, when comparing the image data and the audio data in the same time, an amount of audio data is fairly smaller than an amount of image data. In the embodiment, therefore, the transfer period of the sync signal 2 is set to 1/10 of the transfer period of the sync signal 1.

Figure 6:
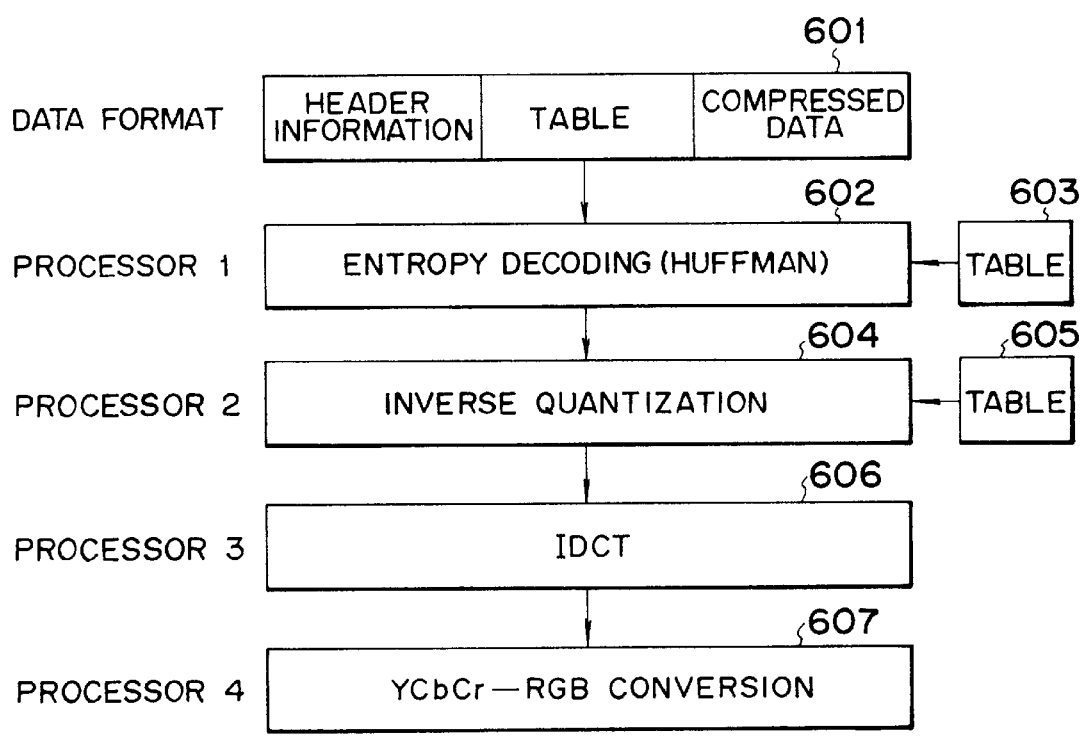
FIG. 6 is a flowchart for expanding image compressed data.
Figure 7:
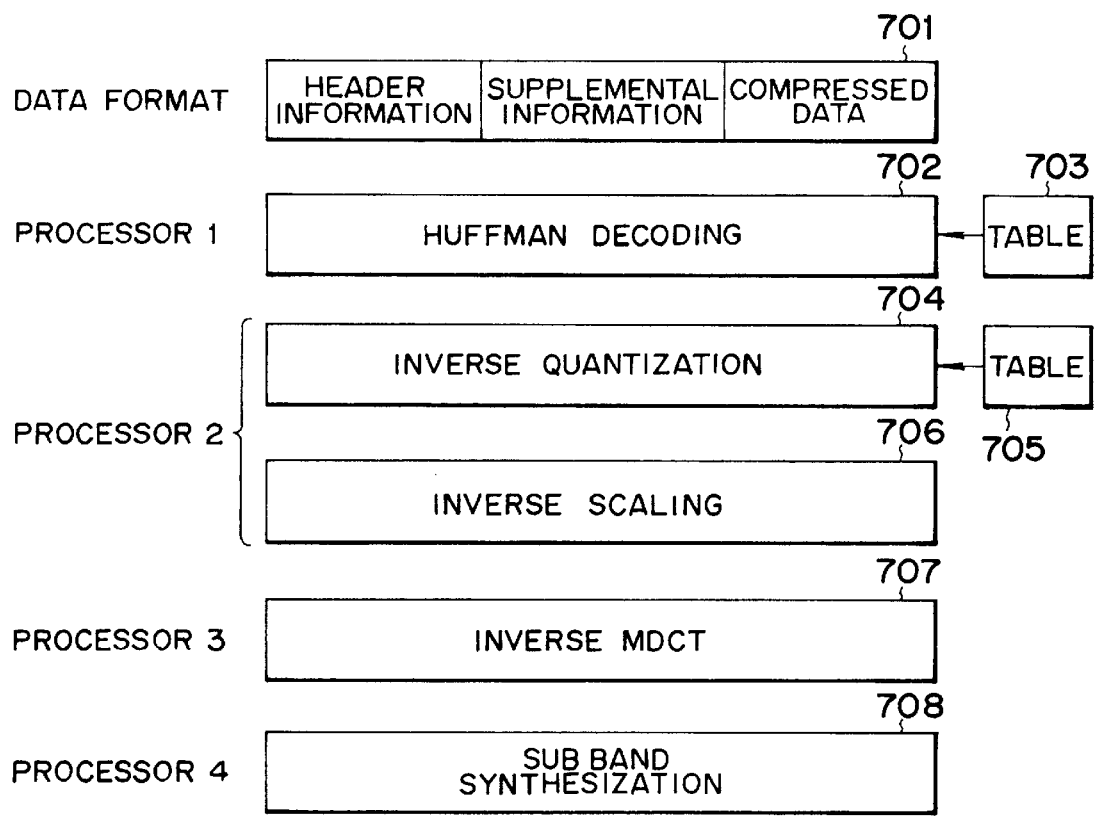
FIG. 7 is a flowchart for expanding audio compressed data.

FIG. 6 is a flowchart for expansion of the image compressed data by the JPEG (Joint Picture Expert Group) in the embodiment. FIG. 7 is a flowchart for expansion of the audio compressed data in the embodiment. In FIGS. 6 and 7, reference numeral 601 denotes a format of the compressed image data. The data includes header information, information to reconstruct a table used upon compression, and compressed data. It is now assumed that time information such as a time code or the like regarding the image data is also included in the header information. Reference numeral 701 denotes a data format of the compressed audio data. The header information, supplemental information, and compressed data are included in the data. It is assumed that time information such as a time code or the like regarding the audio data is also included in the header information.

Figure 8:
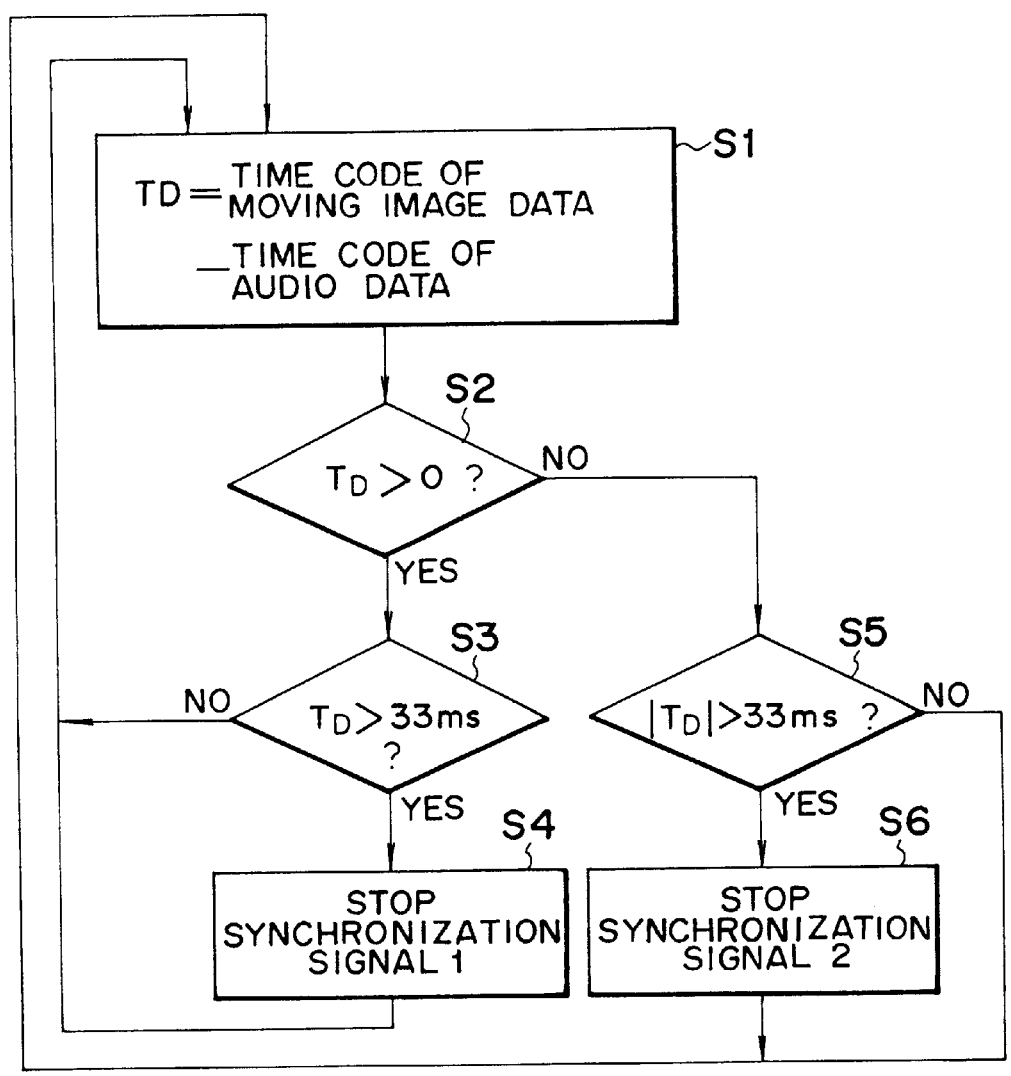
FIG. 8 is a flowchart showing an example of a control of synchronization generation unit.

FIG. 8 is a flowchart showing an example of a control of the sync generation unit. The operations will now be described in detail hereinbelow with reference to the above flowcharts.

When the operation of the apparatus of the embodiment is started, the CPU 201 controls the SCSI controller 202 for a period of time during which the data is being processed by the sync signals 1 and 2 in the data input device 101, namely, for the period of time during which both of the sync signals 1 and 2 are at the high level. The image data and audio data of one picture plane of the image compressed data having the format 601 stored in the disc device 116 and of one picture plane of the image data of the audio data having a format 701 stored in the disc device 117, namely, the image data and audio data of the amounts corresponding to 33 msec are transferred to predetermined positions in the DMA-RAM 205.

In the transfer period of sync signal 1 subsequent to the above period of time, the DMA 1 generates a read-out signal of the image data block stored at the predetermined position to the DMA-RAM 205 and, at the same time, generates a signal to write the data block to a predetermined position to the memory 1. On the other hand, during the transfer period of sync signal 2, the DMA 1 outputs a read-out signal of the audio data block stored at the predetermined position to the DMA-RAM 205 and, at the same time, generates a signal to write the data block to a predetermined position different from that of the image data block to the memory 1. The above method is generally performed as a method for DMA transfer. The sync signals 1 and 2 are supplied to reset terminals of the processors 1 to 4 and are constructed so as to cause a competition of the data for the transfer period.

In the subsequent processing period, in the data input device 101, the image data and audio data of the amount corresponding to the second picture plane are read out from the discs 116 and 117 and are again written to predetermined positions in the DMA-RAM 205. At the same time, the processor 1 executes the following processes with respect to the first data in accordance with the program stored in the ROM 1.

(1) For the processing period of sync signal 1, a table 603 which is necessary for Huffman decoding is produced from the compressed data 601 and the image data is Huffman decoded. Further, the processor 1 writes the image data which was Huffman decoded and the table 603 into predetermined space areas in the memory 1.

(2) For the processing period of sync signal 2, a table 703 which is necessary for Huffman decoding is produced from the compressed data 701 and the audio data is Huffman decoded. Further, the processor 1 writes the audio data which was Huffman decoded and the table 703 into predetermined space areas in the memory 1. After the above processes were executed, an idle state is obtained and the apparatus waits for the next transfer period.

In the subsequent transfer period, the second image and audio data are written to predetermined positions in the memory 1 by the data input device 101 in a manner similar to the preceding transfer period. At the same time, the following processes are executed by the DMA 2.

(1) For the transfer period of sync signal 1, the first image data which had been processed in the preceding processing period and was stored into the predetermined space area in the memory 1 is read out and written to a predetermined position in the memory 2.

(2) For the transfer period of sync signal 2, the audio data is similarly read out and written to a predetermined position in the memory 2.

In the above embodiment, those operations are realized by using the video memory with the dual-port construction for each of the memories 1 to 4, the random access port for writing, and the serial access port for reading out. The invention, however, is not limited to such a memory construction.

For the subsequent data processing period, in the data input device 101, the third image and audio data is read out from the discs 116 and 117 and is written to predetermined positions in the DMA-RAM 205. At the same time, in the processor 1, the second image data is Huffman decoded and the audio data is Huffman decoded. In the processor 2, the following processes are executed.

(1) For the processing period of sync signal 1, an inverse quantization 604 is executed to the first image data of the memory 2 in accordance with the program in the ROM 2. In the inverse quantization, a quantization table 605 using the quantization is reproduced by the data on the memory 2. AC and DC components of each of the luminance signal and color difference signals are reproduced in accordance with the table 605, respectively. The results are written into predetermined space areas in the memory 2.

(2) For the processing period of sync signal 2, an inverse quantization 704 and an inverse scaling process 706 are performed to the first audio data in the memory 2 in accordance with a program in the ROM 2. In the inverse quantization, a quantization table 705 used for quantization is reproduced from the data on the memory 2. AC and DC components of each subband are reproduced in accordance with the table 705. Each size is corrected by the inverse scaling process. The results are written into predetermined space areas in the memory 2.

For the subsequent data transfer period, in a manner similar to the preceding time, the third image and audio data is written to predetermined positions in the memory 1 by the data input device 101 and, at the same time, the second image and audio data which had been Huffman decoded by the processor 1 and was stored to the predetermined positions in the memory 1 is read out by the DMA 2 and is written to predetermined positions in the memory 2. Further, the following processes are executed by the DMA 3.

(1) For the transfer period of sync signal 1, the first image data which had been inversely quantized by the processor 2 and was stored in the predetermined space area in the memory 2 is read out and written to a predetermined position in the memory 3.

(2) For the transfer period of sync signal 2, the first audio data which had been subjected to the inverse quantization, inverse scaling, and the like by the processor 2 and was stored into the predetermined space area in the memory 2 is read out and written to a predetermined position in the memory 3.

For the subsequent data processing period, in the data input device 101, the fourth image and audio data is read out from the discs 116 and 117 and is written to predetermined positions in the DMA-RAM 205. At the same time, in the processor 1, the third image data is Huffman decoded and the audio data is Huffman decoded. Further, in the processor 2, the inverse quantization is performed to the second image data and the inverse quantization and inverse scaling are executed to the audio data. Moreover, the following processes are executed by the processor 3.

(1) For the processing time of sync signal 1, the image data on the memory 3 to which the inverse quantization was executed is subjected to an inverse discrete cosine transformation (IDCT) 606 in accordance with a program stored in the ROM 3. The compressed image data which is used in the embodiment is subjected to a two-dimensional discrete cosine transformation every block of (8×8) pixels and is expressed as one DC coefficient and 63 AC coefficients. Therefore, such an inverse transformation is executed. The luminance signal and color difference signals of one picture plane which were produced as a result of the inverse transformation are written into predetermined space areas in the memory 3.

(2) For the processing period of sync signal 2, the audio data in the memory 3 to which the inverse quantization and the inverse scaling were executed is subjected to an inverse modified discrete cosine transformation (inverse MDCT) 707 in accordance with a program stored in the ROM 3. As for the compressed audio data which is used in the embodiment, since each of the subband signals divided into 32 bands is further subjected to the modified discrete cosine transformation (MDCT) and is expressed by a frequency component. Therefore, its inverse modified discrete cosine transformation is executed. The resultant 32 subband signals are written into predetermined space areas in the memory 3.

For the subsequent data transfer period, in a manner similar to the preceding time, the fourth image and audio data is written to predetermined positions in the memory 1 by the data input device 101. At the same time, the third image and audio data which had been Huffman decoded by the processor 1 and was stored in the predetermined positions in the memory 1 is read out by the DMA 2 and is written to predetermined positions in the memory 2. Further, the second image data to which the inverse quantization was executed by the processor 2 and which was stored in the predetermined position in the memory 2 and the second audio data to which the inverse quantization, inverse scaling, and the like had been performed by the processor 2 and which was stored in the predetermined position in the memory 2 are read out by the DMA 3 and are written to predetermined positions in the memory 3. Further, the following processes are executed by the DMA 4.

(1) For the transfer period of the sync signal 11, the first image data to which the IDCT had been performed by the processor 3 and which was stored in the predetermined space area in the memory 3 is read out and written to a predetermined position in the memory 4.

(2) For the transfer period of sync signal 2, the first audio data to which the inverse MDCT had been performed by the processor 3 and which was stored in the predetermined space area in the memory 3 is read out and written to a predetermined position in the memory 4.

For the subsequent data processing period, the fifth image and audio data is read out from the discs 116 and 117 by the data input device 101 and is written to predetermined positions in the DMA-RAM 205. At the same time, in the processor 1, the fourth image data is Huffman decoded and the audio data is Huffman decoded. In the processor 2, the inverse quantization is performed to the third image data and the inverse quantization and inverse scaling are executed to the audio data. In the processor 3, the IDCT is performed to the second image data and the inverse MDCT is executed to the audio data. Further, the following processes are executed by the processor 4.

(1) For the processing period of sync signal 1, the image data in the memory 4 to which the IDCT had been performed is subjected to a YCbCr-RGB conversion 607 in accordance with a program stored in the ROM 4. The image data is stored into a predetermined space area in the memory 4. The above conversion is executed in accordance with the following expressions.

$R = Y + 1.40200 \times Cr$ $G = Y - 0.34414 \times Cb - 0.71414 \times Cr$ $B = Y + 1.77200 \times Cb$ (2) For the processing period of sync signal 2, the 32 subband audio data in the memory 4 to which the inverse MDCT was executed is synthesized (708) by a subband synthesizing filter. The synthesized audio data is stored into a predetermined space area in the memory 4.

For the subsequent data transfer period, in a manner similar to the preceding time, the fifth image and audio data is written to predetermined positions in the memory 1 by the data input device 101. At the same time, the fourth image and audio data which had been Huffman decoded by the processor 1 and was stored to the predetermined position in the memory 1 is read out by the DMA 2 and written to a predetermined position in the memory 2. The third image data to which the inverse quantization had been executed by the processor 2 and which was stored to the predetermined position in the memory 2 and the third audio data to which the inverse quantization and the inverse scaling and the like had been performed by the processor 2 and which was stored to the predetermined position in the memory 2 are read out by the DMA 3 and written to a predetermined position in the memory 3. At the same time, the second image data to which the IDCT had been performed by the processor 3 and which was stored to the predetermined position in the memory 3 and the second audio data to which the inverse MDCT had been performed by the processor 3 and which was stored to the predetermined position in the memory 3 are read out by the DMA 4 and written to a predetermined position in the memory 4. Further, the following processes are executed by the DMA 5.

(1) For the transfer period of sync signal 1, the first image data which had been RGB converted by the processor 4 and was stored to the predetermined space area in the memory 4 is read out and written into the video memory 301 in the data output device 106.

(2) For the transfer period of sync signal 2, the first audio data which had been subband synthesized by the processor 4 and was stored in the predetermined space area in the memory 4 is read out and written into the audio buffer memory 304 in the data output device 106.

In the data output device 106, the data read out from the video memory 301 is stationarily displayed on the display 118 through the DA converter 303 by the control of the display controller 302. The data is read out from the audio buffer memory 304 at a predetermined speed. Stereophonic audio sounds are generated from the speakers 119 and 120 through the DA converter 305.

In the foregoing information processing apparatus, the synchronization controller 127 reads out the time codes as header information of the image data and audio data which were processed by the processor 4 from the memory 4 and monitors them and controls so as to reduce the difference between them. However, in consideration of a delay of the memory in the data output device 106 as well, the controller 127 controls so that the difference between the time code of the image data which is displayed on the display 118 and the time code of the audio data which is generated from the speakers 119 and 120 is less than one frame ($\frac{1}{30}$ sec). That is, in the case where the difference between the time codes of the image data and audio data in the processor 4 is equal to or larger than a specific value, the sync controller 127 stops or delays the sync signal 11 or 2 by the control signal 1 (130) or control signal 2 (131), respectively thereby delaying the processes of the image data or audio data and controlling so as to minimize the difference between the time codes at the time of output of both of the image and audio data.

FIG. 8 shows an example of a control of the synchronization mechanism. There is no need to monitor the time codes with respect to all of the audio data but it is sufficient to execute such a monitoring operation a few number of times per picture plane of the image data.

First, in step 1, S1 a difference $T_D$ between the time code of the image data and the time code of the audio data is calculated. In step 2, S2 a check is made to see if $T_D$ is larger than 0 or not. When it is larger (YES in step S2), step 3 S3 follows and a check is made to see if $T_D$ is larger than the period 33 msec of the sync signal or not. When it is larger (YES in S3), step 4 S4 follows and the sync signal 1 is stopped and the processing routine is returned to step 1. When it is not larger (NO in step S3), the processing routine is returned to step 1. When it is not larger in step 2 (NO in S2), the processing routine advances to step 5 S5 and a check is made to see if the absolute value of $T_D$ (namely, $|T_D|$) is larger than 33 msec or not. If it is larger (YES in S5), step 6 S6 follows and the sync signal 2 is stopped and the processing routine is returned to step 1. When it is not larger (NO in S5), the processing routine is directly returned to step 1. In place of stopping the sync signal, the sync signal can be also delayed by a predetermined time.

In the embodiment, although the sync signal has been stopped or delayed, the invention is not limited to such an example. The invention can be also embodied in a form such that the period of the sync signal is changed (is made fast or is delayed). In the embodiment, although the standard period of sync signal 2 has been set to the same value (1/30 sec) as sync signal 1, the invention is not limited to such a value. The invention can be also embodied in a form such that the standard period of sync signal 2 is set to a period different from that of sync signal 1 in accordance with a grain size in the compressing system, namely, a size of data block, the number of taps of the filter to expand, or the like. Further, in the embodiment, the kinds of data sources has been set to two kinds (series) of the image and audio data and only the explanation has been made with respect to the two sync signals 1 and 2. However, the invention can be also embodied by a method similar to the embodiment with regard to an apparatus using a plurality of data sources of three or more and a plurality of sync signals of three or more. Although the embodiment has been described with respect to the data compression and expansion based on the JPEG, for example, the invention can be also applied to data compression and expansion based on the MPEG.

As described above, according to the embodiment, continuous data of a plurality of series such as moving image data and its audio data in which the contents of data are related to each other with respect to time can be processed without losing the time-dependent relation.

What is claimed is:

1. An information processing apparatus in which a plurality of different kinds of data series in which the contents of each of the data series are related to each other with respect to a time, are pipeline processed by a data processing system, comprising:

a plurality of sync generation means each for generating a sync signal indicating timings for data transfer and data process of said plurality of data series; and sync control means for controlling generation cycles of the sync signals in said plurality of sync generating means in accordance with a degree of progress of the pipeline process of said plurality of data series in said data processing system so that each of the data series is reproduced at the same timing by a predetermined reproducing means.

2. An apparatus according to claim 1, wherein the plurality of different kinds of data series include image data and audio data.

3. An apparatus according to claim 1, wherein each of said data series is input through a different data source.

4. An apparatus according to claim 1, wherein said plurality of sync generating means generate different sync signals.

5. An apparatus according to claim 1, wherein said data processing system executes encoding and decoding processes of input data.

6. An information processing apparatus comprising:

(a) a plurality of means for pipeline processing a plurality of different kinds of data series separately;

(b) means for detecting a difference of degrees of progress of processings performed by said plurality of pipeline processing means on the respective data series; and (c) control means for controlling the difference of degree of progress of pipeline processings of said plurality of pipeline processing means on the basis of said detecting result so that each of the data series is reproduced at the same timing by predetermined reproducing means.

7. An apparatus according to claim 6, wherein the plurality of different data series are image data series and audio data series.

8. An apparatus according to claim 7, wherein said image data series and said audio data series contains a time code data.

9. An apparatus according to claim 8, wherein said detecting means detects said difference according to said time code data contained in said image data series and said audio data series.

10. An apparatus according to claim 6, wherein said control means controls a supply cycle of one of sync signals to be supplied to said plurality of pipeline processing means, according to the detecting result.

* * * * *

UNITED STATES PATENT AND TRADEMARK OFFICE
CERTIFICATE OF CORRECTION

PATENT NO. : 5,995,751
DATED : November 30, 1999
INVENTOR(S) : Masato Kosugi et al.

It is certified that error appears in the above-identified patent and that said Letters Patent is hereby corrected as shown below:

Column 1,
Line 16, delete "of the" and insert therefor -- of time --

Column 3,
Line 16, after "uses" delete "this".

Column 7,
Line 13, after "signal" delete "11" and insert therefor -- 1 --.

Column 8,
Line 42, after "signal" delete "11" and insert therefor -- 1 --.
Line 43, after "respectively" insert -- , --.

Signed and Sealed this

Seventeenth Day of August, 2004

JON W. DUDAS
*Acting Director of the United States Patent and Trademark Office*